United States Patent
Morrison et al.

(10) Patent No.: US 11,981,110 B2
(45) Date of Patent: *May 14, 2024

(54) MULTILAYER FILM AND METHOD OF FORMING THE SAME

(71) Applicant: SAINT-GOBAIN PERFORMANCE PLASTICS CORPORATION, Solon, OH (US)

(72) Inventors: Rachel Morrison, Cambridge, MA (US); Gowri Dorairaju, Westford, MA (US); Sethumadhavan Ravichandran, Shrewsbury, MA (US); Vincent Prud'homme, Vernou-sur-Brenne (FR); Meghann White, Bedford, NH (US); Michael A. Adamko, Morristown, NJ (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,413

(22) Filed: Dec. 16, 2022

(65) Prior Publication Data

US 2023/0191762 A1    Jun. 22, 2023

Related U.S. Application Data

(60) Provisional application No. 63/265,788, filed on Dec. 21, 2021.

(51) Int. Cl.
*B32B 27/32*    (2006.01)
*B32B 7/023*    (2019.01)
(Continued)

(52) U.S. Cl.
CPC ............ *B32B 27/322* (2013.01); *B32B 7/023* (2019.01); *B32B 7/12* (2013.01); *B32B 27/36* (2013.01);
(Continued)

(58) Field of Classification Search
None
See application file for complete search history.

(56) References Cited

U.S. PATENT DOCUMENTS

| 5,650,019 A | 7/1997 | Yamada et al. |
| 8,525,191 B2 | 9/2013 | Zhou et al. |

(Continued)

FOREIGN PATENT DOCUMENTS

| CN | 113060941 A | 7/2021 |
| JP | 2013145807 A | 7/2013 |

(Continued)

OTHER PUBLICATIONS

Machine translation of WO 2007/116688 A1 (Year: 2007).*

(Continued)

*Primary Examiner* — Ramsey Zacharia
(74) *Attorney, Agent, or Firm* — Abel Schillinger, LLP; Chi Suk Kim

(57) ABSTRACT

The present disclosure relates to a multilayer film may include a fluoropolymer based layer that may include a fluoropolymer based material, and an adhesive layer in contact with the fluoropolymer based layer. The adhesive layer may include a first ultra-violet (UV) absorber component. The multilayer film may have a lower ultra-violet light transmission (L-UVLT) of not greater than 1.0%, where the L-UVLT of the multilayer film is defined as the percent transmission between 200 nm and 360 nm. The multilayer film may further have a high ultra-violet light transmission (H-UVLT) of not greater than 5.0%, where the H-UVLT of
(Continued)

the multilayer film is defined as the percent transmission between 360 nm and 380 nm. The multilayer film may include a visual light transmission (VLT) of at least about 50.0%, where the VLT of the multilayer film is defined as the percent transmission between 400 nm and 1100 nm.

18 Claims, 4 Drawing Sheets

(51) Int. Cl.
  *B32B 7/12* (2006.01)
  *B32B 27/36* (2006.01)
(52) U.S. Cl.
  CPC ....... *B32B 2250/02* (2013.01); *B32B 2250/24* (2013.01); *B32B 2307/40* (2013.01); *B32B 2405/00* (2013.01)

(56) References Cited

U.S. PATENT DOCUMENTS

| | | | |
|---|---|---|---|
| 9,362,433 | B2 | 6/2016 | Britt et al. |
| 9,525,090 | B2 | 12/2016 | Sharma et al. |
| 10,365,415 | B2 | 7/2019 | Schmidt |
| 2007/0295387 | A1 | 12/2007 | Adriani et al. |
| 2010/0220388 | A1 | 9/2010 | Suzuki et al. |
| 2011/0247686 | A1 | 10/2011 | Honeker et al. |
| 2011/0249325 | A1 | 10/2011 | Zehentmaier et al. |
| 2011/0297228 | A1 | 12/2011 | Li et al. |
| 2012/0063952 | A1 | 3/2012 | Hong et al. |
| 2014/0036175 | A1 | 2/2014 | Morishima et al. |
| 2015/0152558 | A1 | 6/2015 | Walther et al. |
| 2017/0145183 | A1 | 5/2017 | Hebrink |
| 2018/0309005 | A1 | 10/2018 | Weigel et al. |
| 2019/0359783 | A1 | 11/2019 | Demko |
| 2020/0061959 | A1 | 2/2020 | Roe et al. |
| 2023/0191752 | A1 | 6/2023 | Morrison et al. |
| 2023/0192923 | A1 | 6/2023 | Morrison et al. |

FOREIGN PATENT DOCUMENTS

| | | | | |
|---|---|---|---|---|
| JP | 2019161045 A | | 9/2019 | |
| KR | 20210123851 A | | 10/2021 | |
| WO | WO-2007116688 A1 | * | 10/2007 | ............ B32B 27/08 |
| WO | 2015057555 A1 | | 4/2015 | |
| WO | 2016046300 A1 | | 3/2016 | |
| WO | 2017087311 A1 | | 5/2017 | |
| WO | 2020096757 A1 | | 5/2020 | |
| WO | 2021137125 A1 | | 7/2021 | |
| WO | 2023122502 A1 | | 6/2023 | |
| WO | 2023122504 A1 | | 6/2023 | |
| WO | 2023122505 A1 | | 6/2023 | |

OTHER PUBLICATIONS

International Search Report and Written Opinion for PCT Application No. PCT/US2022/081819, dated Apr. 17, 2023, 10 pages.
International Search Report and Written Opinion for PCT Application No. PCT/US2022/081808, dated Apr. 28, 2023, 9 pages.
International Search Report and Written Opinion for PCT Application No. PCT/US2022/081814, dated Apr. 28, 2023, 9 pages.

* cited by examiner

MULTILAYER FILM AND METHOD OF FORMING THE SAME

CROSS-REFERENCE TO RELATED APPLICATION(S)

This application claims priority under 35 U.S.C. § 119(e) to U.S. Provisional Patent Application No. 63/265,788, entitled "MULTILAYER FILM AND METHOD OF FORMING THE SAME," by Rachel MORRISON et al., filed Dec. 21, 2021, which is assigned to the current assignee hereof and is incorporated herein by reference in its entirety.

FIELD OF THE DISCLOSURE

The present disclosure relates to a multilayer film, and methods of forming the same. In particular, the present disclosure relates to a multilayer film for use as front sheet material for photovoltaic applications, and methods of forming the same.

BACKGROUND

Multilayer films that include fluoropolymer layers have been used as front sheet materials for photovoltaic applications due to their excellent weatherability and self-cleaning properties. However, most fluoropolymer materials are also transparent to ultra-violet radiation, and the organic photoactive layers in organic photovoltaics (OPV) are highly susceptible to ultra-violet degradation. Accordingly, improved multilayer films that demonstrate improved ultra-violet blocking functionality are desired.

SUMMARY

According to a first aspect, a multilayer film may include a fluoropolymer based layer that may include a fluoropolymer based material, and an adhesive layer in contact with the fluoropolymer based layer. The adhesive layer may include a first ultra-violet (UV) absorber component. The multilayer film may have a lower ultra-violet light transmission (L-UVLT) of not greater than 1.0%, where the L-UVLT of the multilayer film is defined as the percent transmission between 200 nm and 360 nm. The multilayer film may further have a high ultra-violet light transmission (H-UVLT) of not greater than 5.0%, where the H-UVLT of the multilayer film is defined as the percent transmission between 360 nm and 380 nm. The multilayer film may include a visual light transmission (VLT) of at least about 50.0%, where the VLT of the multilayer film is defined as the percent transmission between 400 nm and 1100 nm.

According to another aspect, a method of forming a multilayer film may include providing a fluoropolymer based layer that may include a fluoropolymer based material, and forming an adhesive layer that is in contact with the fluoropolymer based layer. The adhesive layer may include a first ultra-violet (UV) absorber component. The multilayer film may have a lower ultra-violet light transmission (L-UVLT) of not greater than 1.0%, where the L-UVLT of the multilayer film is defined as the percent transmission between 200 nm and 360 nm. The multilayer film may further have a high ultra-violet light transmission (H-UVLT) of not greater than 5.0%, where the H-UVLT of the multilayer film is defined as the percent transmission between 360 nm and 380 nm. The multilayer film may include a visual light transmission (VLT) of at least about 50.0%, where the VLT of the multilayer film is defined as the percent transmission between 400 nm and 1100 nm.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a multilayer film that may include a fluoropolymer based layer and an adhesive layer in contact with the fluoropolymer based layer.

Figure 1:
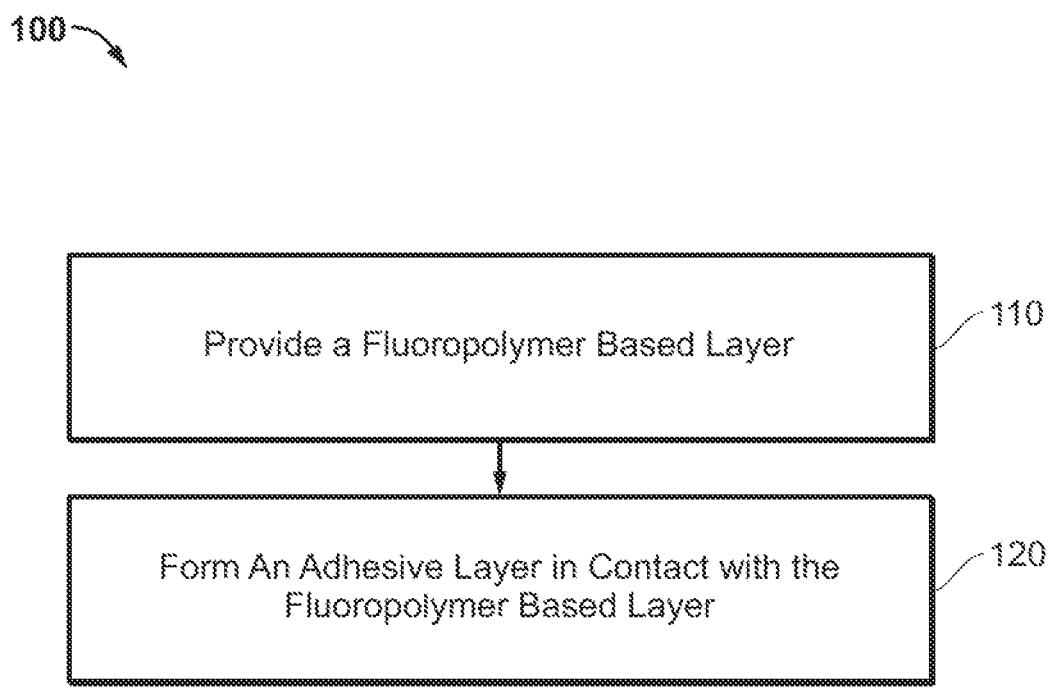
FIG. 1 includes a diagram showing a multilayer film forming method according to embodiments described herein.

Referring first to a method of forming a multilayer film, FIG. 1 includes a diagram showing a forming method 100 for forming a multilayer film according to embodiments described herein. According to particular embodiments, the forming method 100 may include a first step 110 of providing a fluoropolymer based layer, and a second step 120 of forming an adhesive layer that is in contact with the fluoropolymer based layer to form the multilayer film.

Referring first to step 110, according to particular embodiments, the fluoropolymer based layer may include a fluoropolymer based material.

According to particular embodiments, the fluoropolymer based material of the fluoropolymer based layer may include a fluoropolymer. According to still other embodiments, the fluoropolymer may be selected from the group consisting of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, and a copolymer of ethylene and trifluoroethylene.

According to still other embodiments, the fluoropolymer may be any blend of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, or a copolymer of ethylene and trifluoroethylene.

According to yet other embodiments, the fluoropolymer may be any alloy of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, or a copolymer of ethylene and trifluoroethylene.

According to yet other embodiments, the fluoropolymer based layer provided in first step 110 may include a particular content of the fluoropolymer based material. For example, the fluoropolymer based layer may include a fluoropolymer based material content of at least about 50 wt. % for a total weight of the fluoropolymer based layer, such as, at least about 53 wt. % or at least about 55 wt. % or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to yet other embodiments, the fluoropolymer based layer may include a fluoropolymer based material content of not greater than about 100 wt. %, for a total weight of the fluoropolymer based layer, such as, not greater than about 98 wt. % or not greater than about 95 wt. % or not greater than about 93 wt. % or not greater than about 90 wt. % or not greater than about 88 wt. % or not greater than about 85 wt. % or not greater than about 83 wt. % or not greater than about 80 wt. % or even not greater than about 78 wt. %. It will be appreciated that the fluoropolymer based material content may be any value between, and including, any of the minimum and maximum values noted above. It will be further appreciated that the fluoropolymer based material content may be within a range between, and including, any of the minimum and maximum values noted above.

According to yet other embodiments, the fluoropolymer based layer provided in first step 110 may include a particular content of ETFE. For example, the fluoropolymer based layer may include an ETFE content of at least about 50 wt. % for a total weight of the fluoropolymer based layer, such as, at least about 53 wt. % or at least about 55 wt. % or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to yet other embodiments, the fluoropolymer based layer may include an ETFE content of not greater than about 100 wt. %, for a total weight of the fluoropolymer based layer, such as, not greater than about 98 wt. % or not greater than about 95 wt. % or not greater than about 93 wt. % or not greater than about 90 wt. % or not greater than about 88 wt. % or not greater than about 85 wt. % or not greater than about 83 wt. % or not greater than about 80 wt. % or even not greater than about 78 wt. %. It will be appreciated that the ETFE content may be any value between, and including, any of the minimum and maximum values noted above. It will be further appreciated that the ETFE content may be within a range between, and including, any of the minimum and maximum values noted above.

According to yet other embodiments, the fluoropolymer based layer provided in first step 110 may consist of ETFE.

According to still other embodiments, the fluoropolymer based layer provided in first step 110 may have a particular thickness. For example, the fluoropolymer based layer may have a thickness of at least about 10 μm, such as, at least about 20 μm or at least about 30 μm or at least about 40 μm or at least about 50 μm or at least about 60 μm or at least about 70 μm or at least about 80 μm or at least about 90 μm or at least about 100 μm or at least about 150 μm or at least about 200 μm or at least about 250 μm or at least about 300 μm or at least about 350 μm or at least about 400 μm or at least about 450 μm or even at least about 500 μm. According to still other embodiments, the fluoropolymer based layer may have a thickness of not greater than about 1000 μm, such as, not greater than about 950 μm or not greater than about 900 μm or not greater than about 850 μm or not greater than about 800 μm or not greater than about 750 μm or not greater than about 700 μm or not greater than about 650 μm or not greater than about 600 μm or even not greater than about 550 μm. It will be appreciated that fluoropolymer based layer thickness may be any value between, and including, any of the minimum and maximum values noted above. It will be further appreciated that the fluoropolymer based layer thickness may be within a range between, and including, any of the minimum and maximum values noted above.

Referring now the second step 120, the adhesive layer may include an adhesive component and a first adhesive layer UV absorber component.

According to particular embodiments, the adhesive component of the adhesive layer formed in second step 120 may include an acrylic based adhesive, a polyurethane based adhesive, a silicone based adhesive, or an epoxy based adhesive. According to still other embodiments, the adhesive component of the adhesive layer formed in second step 120 may consist of an acrylic based adhesive, a polyurethane based adhesive, a silicone based adhesive, or an epoxy based adhesive.

According to yet other embodiments, the adhesive layer formed in second step 120 may include a particular adhesive component content. For example, adhesive layer may have an adhesive component content may be at least about 35 wt. % for a total weight of the adhesive layer, such as, at least about 38 wt. % or at least about 40 wt. % or at least about 43 wt. % or at least about 45 wt. % or at least about 48 wt. % or at least about 50 wt. % or at least about 53 wt. % or at least about 55 wt. % or at least about 58 wt. % or at least about 60 wt. % or at least about 63 wt. % or at least about 65 wt. % or at least about 68 wt. % or at least about 70 wt. % or at least about 73 wt. % or at least about 75 wt. %. According to yet other embodiments, the adhesive layer may have an adhesive component content of not greater than about 99.95 wt. % for a total weight of the adhesive layer, such as, not greater than about 99 wt. % or not greater than about 95 wt. % or not greater than about 93 wt. % or not greater than about 90 wt. % or not greater than about 88 wt. % or not greater than about 85 wt. % or not greater than about 83 wt. % or not greater than about 80 wt. % or even not greater than about 78 wt. %. It will be appreciated that the adhesive component content may be any value between, and including, any of the minimum and maximum values noted above. It will be further appreciated that the adhesive component content may be within a range between, and including, any of the minimum and maximum values noted above.

According to still other embodiments, the first adhesive layer UV absorber component of the adhesive layer formed in second step 120 may include a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide. According to yet other embodiments, the first adhesive layer UV absorber component of the adhesive layer formed in second step 120 may consist of a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

According to yet other embodiments, the adhesive layer formed in second step 120 may include a particular first adhesive layer UV absorber component content. For example, adhesive layer may have an first adhesive layer UV absorber component content may be at least about 0.05 wt. % for a total weight of the adhesive layer, such as, at least about 0.5 wt. % or at least about 1.0 wt. % or at least about 3 wt. % or at least about 5 wt. % or at least about 8 wt. % or at least about 10 wt. % or at least about 13 wt. % or at least about 15 wt. % or at least about 18 wt. % or at least about 20 wt. % or at least about 23 wt. % or at least about 25 wt. % or at least about 28 wt. % or at least about 30 wt. % or at least about 33 wt. % or at least about 35 wt. %. According to yet other embodiments, the adhesive layer may have an first adhesive layer UV absorber component content of not greater than about 65 wt. % for a total weight of the adhesive layer, such as, not greater than about 63 wt. % or not greater than about 60 wt. % or not greater than about 58 wt. % or not greater than about 55 wt. % or not greater than about 53 wt. % or not greater than about 50 wt. % or not greater than about 48 wt. % or not greater than about 45 wt. % or even not greater than about 43 wt. %. It will be appreciated that the first adhesive layer UV absorber component content may be any value between, and including, any of the minimum and maximum values noted above. It will be further appreciated that the first adhesive layer UV absorber component content may be within a range between, and including, any of the minimum and maximum values noted above.

According to still other embodiments, the adhesive layer formed in second step 120 may further include a second adhesive layer UV absorber component.

According to still other embodiments, the second adhesive layer UV absorber component of the adhesive layer formed in second step 120 may include a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide. According to yet other embodiments, the second adhesive layer UV absorber component of the adhesive layer formed in second step 120 may consist of a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

According to yet other embodiments, the adhesive layer formed in second step 120 may include a particular second adhesive layer UV absorber component content. For example, adhesive layer may have an second adhesive layer UV absorber component content may be at least about 0.05 wt. % for a total weight of the adhesive layer, such as, at least about 0.5 wt. % or at least about 1.0 wt. % or at least about 3 wt. % or at least about 5 wt. % or at least about 8 wt. % or at least about 10 wt. % or at least about 13 wt. % or at least about 15 wt. % or at least about 18 wt. % or at least about 20 wt. % or at least about 23 wt. % or at least about 25 wt. % or at least about 28 wt. % or at least about 30 wt. % or at least about 33 wt. % or at least about 35 wt. %. According to yet other embodiments, the adhesive layer may have an second adhesive layer UV absorber component content of not greater than about 65 wt. % for a total weight of the adhesive layer, such as, not greater than about 63 wt. % or not greater than about 60 wt. % or not greater than about 58 wt. % or not greater than about 55 wt. % or not greater than about 53 wt. % or not greater than about 50 wt. % or not greater than about 48 wt. % or not greater than about 45 wt. % or even not greater than about 43 wt. %. It will be appreciated that the second adhesive layer UV absorber component content may be any value between, and including, any of the minimum and maximum values noted above. It will be further appreciated that the second adhesive layer UV absorber component content may be within a range between, and including, any of the minimum and maximum values noted above.

According to still other embodiments, the adhesive layer provided in second step 120 may have a particular thickness. For example, the adhesive layer may have a thickness of at least about 0.1 µm, such as, at least about 0.5 µm or at least about 1.0 µm or at least about 5 µm or at least about 10 µm or at least about 15 µm or at least about 20 µm or at least about 30 µm or at least about 40 µm or at least about 50 µm or at least about 60 µm or at least about 70 µm or at least about 80 µm or at least about 90 µm or at least about 100 µm or at least about 150 µm or at least about 200 µm or even at least about 250 µm. According to still other embodiments, the adhesive layer may have a thickness of not greater than about 500 µm, such as, not greater than about 475 µm or not greater than about 450 µm or not greater than about 425 µm or not greater than about 400 µm or not greater than about 375 µm or not greater than about 350 µm or not greater than about 325 µm or not greater than about 300 µm or even not greater than about 275 µm. It will be appreciated that adhesive layer thickness may be any value between, and including, any of the minimum and maximum values noted above. It will be further appreciated that the adhesive layer thickness may be within a range between, and including, any of the minimum and maximum values noted above.

According to still other embodiments, the adhesive layer provided in second step 120 may have a corona-treated surface. According to still other embodiments, the corona-treated surface of the adhesive layer may contact the fluoropolymer based layer.

Referring back to the first step 110, according to other embodiments, the fluoropolymer based layer may further include a first fluoropolymer based layer UV absorber component.

According to still other embodiments, the first fluoropolymer based layer UV absorber component of the fluoropolymer based layer formed in the first step 110 may include a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide. According to yet other embodiments, the first fluoropolymer based layer UV absorber component of the fluoropolymer based layer formed in the first step 110 may consist of a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

According to yet other embodiments, the fluoropolymer based layer formed in the first step 110 may include a particular first fluoropolymer based layer UV absorber component content. For example, fluoropolymer based layer may have an first fluoropolymer based layer UV absorber component content may be at least about 0.05 wt. % for a total weight of the fluoropolymer based layer, such as, at least about 0.5 wt. % or at least about 1.0 wt. % or at least about 3 wt. % or at least about 5 wt. % or at least about 8 wt. % or at least about 10 wt. % or at least about 13 wt. % or at least about 15 wt. % or at least about 18 wt. % or at least about 20 wt. % or at least about 23 wt. % or at least about 25 wt. % or at least about 28 wt. % or at least about 30 wt. % or at least about 33 wt. % or at least about 35 wt. %. According to yet other embodiments, the fluoropolymer based layer may have an first fluoropolymer based layer UV absorber component content of not greater than about 65 wt. % for a total weight of the fluoropolymer based layer, such as, not greater than about 63 wt. % or not greater than about 60 wt. % or not greater than about 58 wt. % or not greater than about 55 wt. % or not greater than about 53 wt. % or not greater than about 50 wt. % or not greater than about 48 wt. % or not greater than about 45 wt. % or even not greater than about 43 wt. %. It will be appreciated that the first fluoropolymer based layer UV absorber component content may be any value between, and including, any of the minimum and maximum values noted above. It will be further appreciated that the first fluoropolymer based layer UV absorber component content may be within a range between, and including, any of the minimum and maximum values noted above.

According to still other embodiments, the fluoropolymer based layer formed in the first step 110 may further include a second fluoropolymer based layer UV absorber component.

According to still other embodiments, the second fluoropolymer based layer UV absorber component of the fluoropolymer based layer formed in the first step 110 may include a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide. According to yet other embodiments, the second fluoropolymer based layer UV absorber component of the fluoropolymer based layer formed in the first step 110 may consist of a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

According to yet other embodiments, the fluoropolymer based layer formed in the first step 110 may include particular second fluoropolymer based layer UV absorber component content. For example, fluoropolymer based layer may have an second fluoropolymer based layer UV absorber component content may be at least about 0.05 wt. % for a total weight of the fluoropolymer based layer, such as, at least about 0.5 wt. % or at least about 1.0 wt. % or at least about 3 wt. % or at least about 5 wt. % or at least about 8 wt. % or at least about 10 wt. % or at least about 13 wt. % or at least about 15 wt. % or at least about 18 wt. % or at least about 20 wt. % or at least about 23 wt. % or at least about 25 wt. % or at least about 28 wt. % or at least about 30 wt. % or at least about 33 wt. % or at least about 35 wt. %. According to yet other embodiments, the fluoropolymer based layer may have an second fluoropolymer based layer UV absorber component content of not greater than about 65 wt. % for a total weight of the fluoropolymer based layer, such as, not greater than about 63 wt. % or not greater than about 60 wt. % or not greater than about 58 wt. % or not greater than about 55 wt. % or not greater than about 53 wt. % or not greater than about 50 wt. % or not greater than about 48 wt. % or not greater than about 45 wt. % or even not greater than about 43 wt. %. It will be appreciated that the second fluoropolymer based layer UV absorber component content may be any value between, and including, any of the minimum and maximum values noted above. It will be further appreciated that the second fluoropolymer based layer UV absorber component content may be within a range between, and including, any of the minimum and maximum values noted above.

Figure 2:
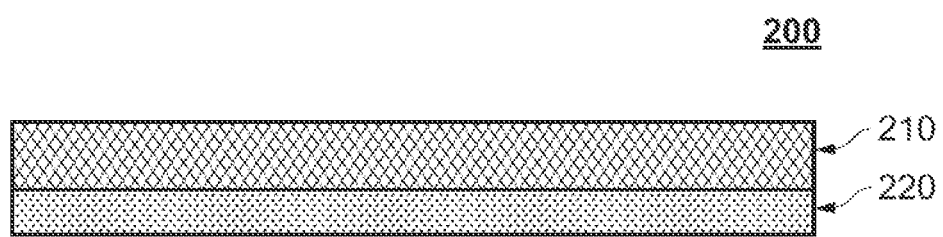
FIG. 2 includes an illustration showing the configuration of a multilayer film formed according to embodiments described herein.

Referring now to embodiments of the multilayer film formed according to forming method 100, FIG. 2 includes diagram of a multilayer film 200. As shown in FIG. 2, the multilayer film 200 may include a fluoropolymer based layer 210 and an adhesive layer 220 in contact with the fluoropolymer based layer 210.

According to particular embodiments, the fluoropolymer based layer 210 may include a fluoropolymer based material.

According to particular embodiments, the fluoropolymer based material of the fluoropolymer based layer 210 may include a fluoropolymer. According to still other embodiments, the fluoropolymer may be selected from the group consisting of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, and a copolymer of ethylene and trifluoroethylene.

According to still other embodiments, the fluoropolymer may be any blend of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, or a copolymer of ethylene and trifluoroethylene.

According to yet other embodiments, the fluoropolymer may be any alloy of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, or a copolymer of ethylene and trifluoroethylene.

According to yet other embodiments, the fluoropolymer based layer 210 may include a particular content of the fluoropolymer based material. For example, the fluoropolymer based layer 210 may include a fluoropolymer based material content of at least about 50 wt. % for a total weight of the fluoropolymer based layer 210, such as, at least about 53 wt. % or at least about 55 wt. % or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to yet other embodiments, the fluoropolymer based layer 210 may include a fluoropolymer based material content of not greater than about 100 wt. %, for a total weight of the fluoropolymer based layer 210, such as, not greater than about 98 wt. % or not greater than about 95 wt. % or not greater than about 93 wt. % or not greater than about 90 wt. % or not greater than about 88 wt. % or not greater than about 85 wt. % or not greater than about 83 wt. % or not greater than about 80 wt. % or even not greater than about 78 wt. %. It will be appreciated that the fluoropolymer based material content may be any value between, and including, any of the minimum and maximum values noted above. It will be further appreciated that the fluoropolymer based material content may be within a range between, and including, any of the minimum and maximum values noted above.

According to yet other embodiments, the fluoropolymer based layer 210 may include a particular content of ETFE. For example, the fluoropolymer based layer 210 may include an ETFE content of at least about 50 wt. % for a total weight of the fluoropolymer based layer 210, such as, at least about 53 wt. % or at least about 55 wt. % or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to yet other embodiments, the fluoropolymer based layer 210 may include an ETFE content of not greater than about 100 wt. %, for a total weight of the fluoropolymer based layer 210, such as, not greater than about 98 wt. % or not greater than about 95 wt. % or not greater than about 93 wt. % or not greater than about 90 wt. % or not greater than about 88 wt. % or not greater than about 85 wt. % or not greater than about 83 wt. % or not greater than about 80 wt. % or even not greater than about 78 wt. %. It will be appreciated that the ETFE content may be any value between, and including, any of the minimum and maximum values noted above. It will be further appreciated that the ETFE content may be within a range between, and including, any of the minimum and maximum values noted above.

According to yet other embodiments, the fluoropolymer based layer 210 may consist of ETFE.

According to still other embodiments, the fluoropolymer based layer 210 may have a particular thickness. For example, the fluoropolymer based layer 210 may have a thickness of at least about 10 µm, such as, at least about 20 µm or at least about 30 µm or at least about 40 µm or at least about 50 µm or at least about 60 µm or at least about 70 µm or at least about 80 µm or at least about 90 µm or at least about 100 µm or at least about 150 µm or at least about 200 µm or at least about 250 µm or at least about 300 µm or at least about 350 µm or at least about 400 µm or at least about 450 µm or even at least about 500 µm. According to still other embodiments, the fluoropolymer based layer 210 may have a thickness of not greater than about 1000 µm, such as, not greater than about 950 µm or not greater than about 900 µm or not greater than about 850 µm or not greater than about 800 µm or not greater than about 750 µm or not greater than about 700 µm or not greater than about 650 µm or not greater than about 600 µm or even not greater than about 550 µm. It will be appreciated that fluoropolymer based layer 210 thickness may be any value between, and including, any of the minimum and maximum values noted above. It will be further appreciated that the fluoropolymer based layer 210 thickness may be within a range between, and including, any of the minimum and maximum values noted above.

According to still other embodiments, the adhesive layer 220 may include an adhesive component and a first adhesive layer UV absorber component.

According to particular embodiments, the adhesive component of the adhesive layer 220 may include an acrylic based adhesive, a polyurethane based adhesive, a silicone based adhesive, or an epoxy based adhesive. According to still other embodiments, the adhesive component of the adhesive layer 220 may consist of an acrylic based adhesive, a polyurethane based adhesive, a silicone based adhesive, or an epoxy based adhesive.

According to yet other embodiments, the adhesive layer 220 may include a particular adhesive component content. For example, adhesive layer 220 may have an adhesive component content may be at least about 35 wt. % for a total weight of the adhesive layer 220, such as, at least about 38 wt. % or at least about 40 wt. % or at least about 43 wt. % or at least about 45 wt. % or at least about 48 wt. % or at least about 50 wt. % or at least about 53 wt. % or at least about 55 wt. % or at least about 58 wt. % or at least about 60 wt. % or at least about 63 wt. % or at least about 65 wt. % or at least about 68 wt. % or at least about 70 wt. % or at least about 73 wt. % or at least about 75 wt. %. According to yet other embodiments, the adhesive layer 220 may have an adhesive component content of not greater than about 99.95 wt. % for a total weight of the adhesive layer 220, such as, not greater than about 99 wt. % or not greater than about 95 wt. % or not greater than about 93 wt. % or not greater than about 90 wt. % or not greater than about 88 wt. % or not greater than about 85 wt. % or not greater than about 83 wt. % or not greater than about 80 wt. % or even not greater than about 78 wt. %. It will be appreciated that the adhesive component content may be any value between, and including, any of the minimum and maximum values noted above. It will be further appreciated that the adhesive component content may be within a range between, and including, any of the minimum and maximum values noted above.

According to still other embodiments, the first adhesive layer UV absorber component of the adhesive layer 220 may include a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide. According to yet other embodiments, the first adhesive layer UV absorber component of the adhesive layer 220 may consist of a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

According to yet other embodiments, the adhesive layer 220 may include a particular first adhesive layer UV absorber component content. For example, adhesive layer 220 may have an first adhesive layer UV absorber component content may be at least about 0.05 wt. % for a total weight of the adhesive layer 220, such as, at least about 0.5 wt. % or at least about 1.0 wt. % or at least about 3 wt. % or at least about 5 wt. % or at least about 8 wt. % or at least about 10 wt. % or at least about 13 wt. % or at least about 15 wt. % or at least about 18 wt. % or at least about 20 wt. % or at least about 23 wt. % or at least about 25 wt. % or at least about 28 wt. % or at least about 30 wt. % or at least about 33 wt. % or at least about 35 wt. %. According to yet other embodiments, the adhesive layer 220 may have an first adhesive layer UV absorber component content of not greater than about 65 wt. % for a total weight of the adhesive layer 220, such as, not greater than about 63 wt. % or not greater than about 60 wt. % or not greater than about 58 wt. % or not greater than about 55 wt. % or not greater than about 53 wt. % or not greater than about 50 wt. % or not greater than about 48 wt. % or not greater than about 45 wt. % or even not greater than about 43 wt. %. It will be appreciated that the first adhesive layer UV absorber component content may be any value between, and including, any of the minimum and maximum values noted above. It will be further appreciated that the first adhesive layer UV absorber component content may be within a range between, and including, any of the minimum and maximum values noted above.

According to still other embodiments, the adhesive layer 220 may further include a second adhesive layer UV absorber component.

According to still other embodiments, the second adhesive layer UV absorber component of the adhesive layer 220 may include a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide. According to yet other embodiments, the second adhesive layer UV absorber component of the adhesive layer 220 may consist of a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

According to yet other embodiments, the adhesive layer 220 may include a particular second adhesive layer UV absorber component content. For example, adhesive layer 220 may have an second adhesive layer UV absorber component content may be at least about 0.05 wt. % for a total weight of the adhesive layer 220, such as, at least about 0.5 wt. % or at least about 1.0 wt. % or at least about 3 wt. % or at least about 5 wt. % or at least about 8 wt. % or at least about 10 wt. % or at least about 13 wt. % or at least about 15 wt. % or at least about 18 wt. % or at least about 20 wt. % or at least about 23 wt. % or at least about 25 wt. % or at least about 28 wt. % or at least about 30 wt. % or at least about 33 wt. % or at least about 35 wt. %. According to yet other embodiments, the adhesive layer 220 may have an second adhesive layer UV absorber component content of not greater than about 65 wt. % for a total weight of the adhesive layer 220, such as, not greater than about 63 wt. % or not greater than about 60 wt. % or not greater than about 58 wt. % or not greater than about 55 wt. % or not greater than about 53 wt. % or not greater than about 50 wt. % or not greater than about 48 wt. % or not greater than about 45 wt. % or even not greater than about 43 wt. %. It will be appreciated that the second adhesive layer UV absorber component content may be any value between, and including, any of the minimum and maximum values noted above. It will be further appreciated that the second adhesive layer UV absorber component content may be within a range between, and including, any of the minimum and maximum values noted above.

According to still other embodiments, the adhesive layer 220 may have a particular thickness. For example, the adhesive layer 220 may have a thickness of at least about 0.1 μm, such as, at least about 0.5 μm or at least about 1.0 μm or at least about 5 μm or at least about 10 μm or at least about 15 μm or at least about 20 μm or at least about 30 μm or at least about 40 μm or at least about 50 μm or at least about 60 μm or at least about 70 μm or at least about 80 μm or at least about 90 μm or at least about 100 μm or at least about 150 μm or at least about 200 μm or even at least about 250 μm. According to still other embodiments, the adhesive layer 220 may have a thickness of not greater than about 500 μm, such as, not greater than about 475 μm or not greater than about 450 μm or not greater than about 425 μm or not greater than about 400 μm or not greater than about 375 μm or not greater than about 350 μm or not greater than about 325 μm or not greater than about 300 μm or even not greater than about 275 μm. It will be appreciated that adhesive layer 220 thickness may be any value between, and including, any of the minimum and maximum values noted above. It will be further appreciated that the adhesive layer 220 thickness may be within a range between, and including, any of the minimum and maximum values noted above.

According to still other embodiments, the adhesive layer 220 may have a corona-treated surface. According to still other embodiments, the corona-treated surface of the adhesive layer 220 may contact the fluoropolymer based layer 210.

According to other embodiments, the fluoropolymer based layer 210 may further include a first fluoropolymer based layer UV absorber component.

According to still other embodiments, the first fluoropolymer based layer UV absorber component of the fluoropolymer based layer 210 may include a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide. According to yet other embodiments, the first fluoropolymer based layer UV absorber component of the fluoropolymer based layer 210 may consist of a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

According to yet other embodiments, the fluoropolymer based layer 210 may include a particular first fluoropolymer based layer UV absorber component content. For example, fluoropolymer based layer 210 may have an first fluoropolymer based layer UV absorber component content may be at least about 0.05 wt. % for a total weight of the fluoropolymer based layer 210, such as, at least about 0.5 wt. % or at least about 1.0 wt. % or at least about 3 wt. % or at least about 5 wt. % or at least about 8 wt. % or at least about 10 wt. % or at least about 13 wt. % or at least about 15 wt. % or at least about 18 wt. % or at least about 20 wt. % or at least about 23 wt. % or at least about 25 wt. % or at least about 28 wt. % or at least about 30 wt. % or at least about 33 wt. % or at least about 35 wt. %. According to yet other embodiments, the fluoropolymer based layer 210 may have an first fluoropolymer based layer UV absorber component content of not greater than about 65 wt. % for a total weight of the fluoropolymer based layer 210, such as, not greater than about 63 wt. % or not greater than about 60 wt. % or not greater than about 58 wt. % or not greater than about 55 wt. % or not greater than about 53 wt. % or not greater than about 50 wt. % or not greater than about 48 wt. % or not greater than about 45 wt. % or even not greater than about 43 wt. %. It will be appreciated that the first fluoropolymer based layer UV absorber component content may be any value between, and including, any of the minimum and maximum values noted above. It will be further appreciated that the first fluoropolymer based layer UV absorber component content may be within a range between, and including, any of the minimum and maximum values noted above.

According to still other embodiments, the fluoropolymer based layer 210 may further include a second fluoropolymer based layer UV absorber component.

According to still other embodiments, the second fluoropolymer based layer UV absorber component of the fluoropolymer based layer 210 may include a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide. According to yet other embodiments, the second fluoropolymer based layer UV absorber component of the fluoropolymer based layer 210 may consist of a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

According to yet other embodiments, the fluoropolymer based layer 210 may include particular second fluoropolymer based layer UV absorber component content. For example, fluoropolymer based layer 210 may have an second fluoropolymer based layer UV absorber component content may be at least about 0.05 wt. % for a total weight of the fluoropolymer based layer 210, such as, at least about 0.5 wt. % or at least about 1.0 wt. % or at least about 3 wt. % or at least about 5 wt. % or at least about 8 wt. % or at least about 10 wt. % or at least about 13 wt. % or at least about 15 wt. % or at least about 18 wt. % or at least about 20 wt. % or at least about 23 wt. % or at least about 25 wt. % or at least about 28 wt. % or at least about 30 wt. % or at least about 33 wt. % or at least about 35 wt. %. According to yet other embodiments, the fluoropolymer based layer 210 may have an second fluoropolymer based layer UV absorber component content of not greater than about 65 wt. % for a total weight of the fluoropolymer based layer 210, such as, not greater than about 63 wt. % or not greater than about 60 wt. % or not greater than about 58 wt. % or not greater than about 55 wt. % or not greater than about 53 wt. % or not greater than about 50 wt. % or not greater than about 48 wt. % or not greater than about 45 wt. % or even not greater than about 43 wt. %. It will be appreciated that the second fluoropolymer based layer UV absorber component content may be any value between, and including, any of the minimum and maximum values noted above. It will be further appreciated that the second fluoropolymer based layer UV absorber component content may be within a range between, and including, any of the minimum and maximum values noted above.

According to still other embodiments, the multilayer film 200 may have a particular lower ultra-violet light transmission (L-UVLT). For purposes of embodiments described herein, a lower ultra-violet light transmission (L-UVLT) of a multilayer film is defined as the percent transmission between 200 nm and 360 nm as measured according to ASTM D1003. According to particular embodiments, the multilayer film 200 may have a L-UVLT of not greater than about 1.0%, such as, not greater than about 0.95% or not greater than about 0.9% or not greater than about 0.8% or not greater than about 0.75% or not greater than about 0.7% or not greater than about 0.65% or not greater than about 0.6% or not greater than about 0.55% or not greater than about 0.5% or not greater than about 0.45% or not greater than about 0.4% or not greater than about 0.35% or not greater than about 0.3% or not greater than about 0.25% or not greater than about 0.2% or not greater than about 0.15% or even not greater than about 0.1%. According to still other embodiments, the multilayer film 200 may have a L-UVLT of at least about 0.0001%, such as, at least about 0.0005%. It will be appreciated that the L-UVLT of the multilayer film 200 may be any value between, and including, any of the minimum and maximum values noted above. It will be further appreciated that the L-UVLT of the multilayer film 200 may be within a range between, and including, any of the minimum and maximum values noted above.

According to still other embodiments, the multilayer film 200 may have a particular high ultra-violet light transmission (H-UVLT). For purposes of embodiments described herein, a high ultra-violet light transmission (H-UVLT) of a multilayer film is defined as the percent transmission between 360 nm and 380 nm as measured according to ASTM D1003. According to particular embodiments, the multilayer film 200 may have a H-UVLT of not greater than about 5.0%, such as, not greater than about 4.9% or not greater than about 4.8% or not greater than about 4.7% or not greater than about 4.6% or not greater than about 4.5% or not greater than about 4.0% or not greater than about 3.5% or not greater than about 3.0% or not greater than about 2.5% or not greater than about 2.0%. According to still other embodiments, the multilayer film 200 may have a H-UVLT of at least about 0.0001%, such as, at least about 0.0005%. It will be appreciated that the H-UVLT of the multilayer film 200 may be any value between, and including, any of the minimum and maximum values noted above. It will be further appreciated that the H-UVLT of the multilayer film 200 may be within a range between, and including, any of the minimum and maximum values noted above.

According to still other embodiments, the multilayer film 200 may have a particular visual light transmission (VLT). For purposes of embodiments described herein, a visual light transmission (VLT) of a multilayer film is defined as the percent transmission between 400 nm and 1100 nm as measured according to ASTM D1003. According to particular embodiments, the multilayer film 200 may have a VLT of at least about 50.0%, such as, at least about 55.0% or at least about 60.0% or at least about 65.0% or at least about 70.0% or at least about 73.0% or at least about 75.0% or at least about 78.0% or at least about 80.0% or at least about 83.0% or at least about 85.0%. According to still other embodiments, the multilayer film 200 may have a VLT of not greater than about 99.9%. It will be appreciated that the VLT of the multilayer film 200 may be any value between, and including, any of the minimum and maximum values noted above. It will be further appreciated that the VLT of the multilayer film 200 may be within a range between, and including, any of the minimum and maximum values noted above.

Referring to alternative embodiments described herein, embodiments are generally directed to a multilayer film that may include a fluoropolymer based layer, a PET layer, and an adhesive layer in contact with the fluoropolymer based layer and in between the fluoropolymer based layer and the PET layer.

Figure 3:
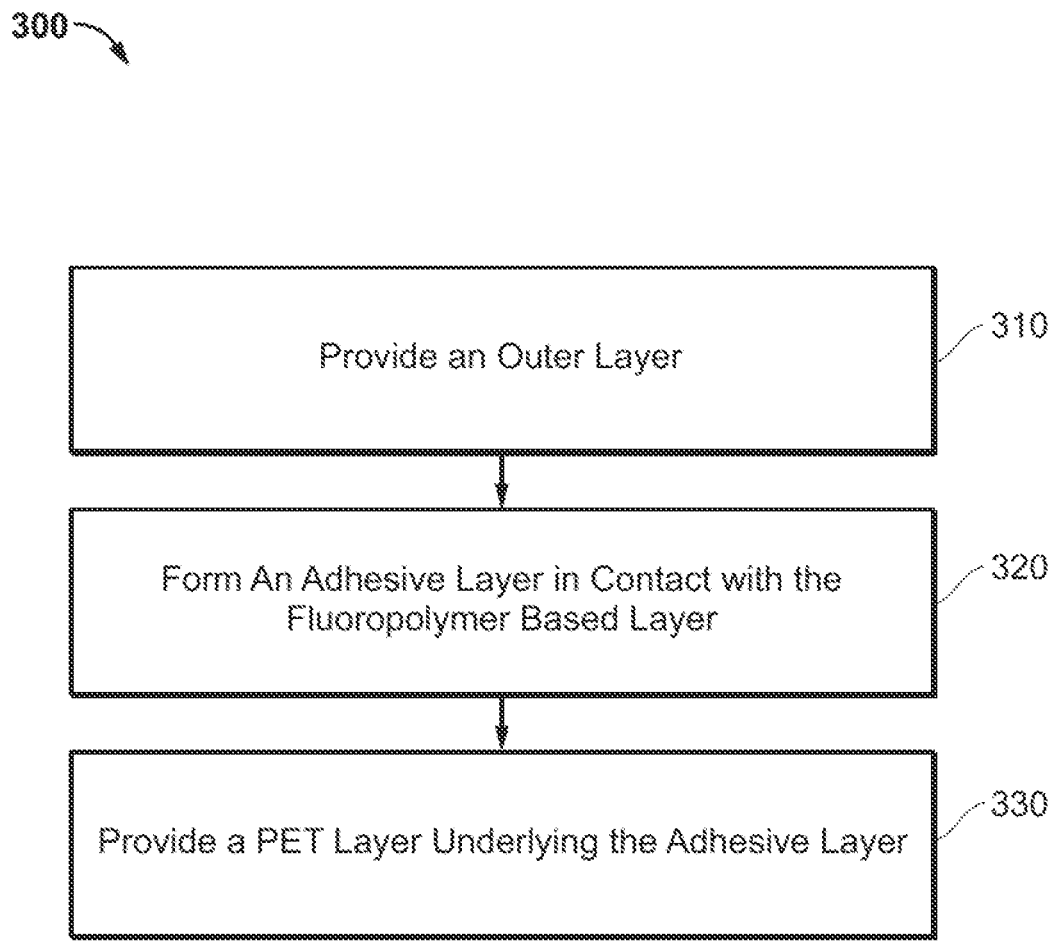
FIG. 3 includes a diagram showing a multilayer film forming method according to embodiments described herein.

A method of forming a multilayer film, FIG. 3 includes a diagram showing a forming method 300 for forming a multilayer film according to embodiments described herein. According to particular embodiments, the forming method 300 may include a first step 310 of providing a fluoropolymer based layer, a second step 320 of forming an adhesive layer that is in contact with the fluoropolymer based layer to form the multilayer film, and a third step 330 of providing a PET layer underlying the adhesive layer so that the adhesive layer is between the fluoropolymer based layer and the PET layer.

It will be appreciated that all description, details and characteristics provided herein in reference to forming method 100 may further apply to or describe correspond aspects of forming method 300.

Referring specifically to the third step 330, the PET layer may have a particular thickness. For example, the PET layer provided in third step 330 may have a thickness of at least about 10 µm, such as, at least about 20 µm or at least about 30 µm or at least about 40 µm or at least about 50 µm or at least about 60 µm or at least about 70 µm or at least about 80 µm or at least about 90 µm or at least about 100 µm or at least about 150 µm or at least about 200 µm or at least about 250 µm or at least about 300 µm or at least about 350 µm or at least about 400 µm or at least about 450 µm or even at least about 500 µm. According to still other embodiments, the PET layer provided in third step 330 may have a thickness of not greater than about 1000 µm, such as, not greater than about 950 µm or not greater than about 900 µm or not greater than about 850 µm or not greater than about 800 µm or not greater than about 750 µm or not greater than about 700 µm or not greater than about 650 µm or not greater than about 600 µm or even not greater than about 550 µm. It will be appreciated that the PET layer thickness may be any value between, and including, any of the minimum and maximum values noted above. It will be further appreciated that the PET layer thickness may be within a range between, and including, any of the minimum and maximum values noted above.

Figure 4:
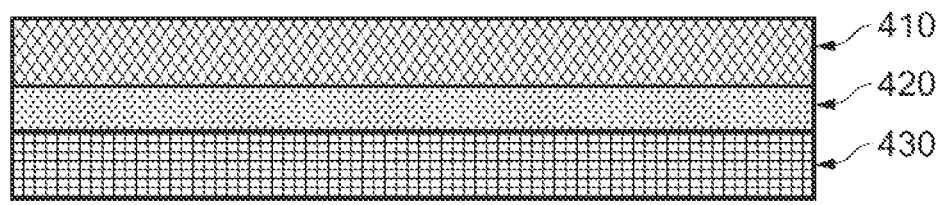
FIG. 4 includes an illustration showing the configuration of a multilayer film formed according to embodiments described herein.

Referring now to embodiments of the multilayer film formed according to forming method 300, FIG. 4 includes diagram of a multilayer film 400. As shown in FIG. 4, the multilayer film 400 may include a fluoropolymer based layer 410, an adhesive layer 420, and a PET layer 430. As shown in FIG. 4, the adhesive layer 420 is in contact with the fluoropolymer based layer 410, and is in between the fluoropolymer based layer 410 and the PET layer 430.

Again, it will be appreciated that all description provided herein in reference to multilayer film 200 may further apply to corresponding aspects of the multilayer film 400, including all component of multilayer film 400.

According to particular embodiments, the PET layer 430 may have a thickness of at least about 10 µm, such as, at least about 20 µm or at least about 30 µm or at least about 40 µm or at least about 50 µm or at least about 60 µm or at least about 70 µm or at least about 80 µm or at least about 90 µm or at least about 100 µm or at least about 150 µm or at least about 200 µm or at least about 250 µm or at least about 300 µm or at least about 350 µm or at least about 400 µm or at least about 450 µm or even at least about 500 µm. According to still other embodiments, the PET layer 430 may have a thickness of not greater than about 1000 µm, such as, not greater than about 950 µm or not greater than about 900 µm or not greater than about 850 µm or not greater than about 800 µm or not greater than about 750 µm or not greater than about 700 µm or not greater than about 650 µm or not greater than about 600 µm or even not greater than about 550 µm. It will be appreciated that the PET layer 430 thickness may be any value between, and including, any of the minimum and maximum values noted above. It will be further appreciated that the PET layer 430 thickness may be within a range between, and including, any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A multilayer film comprising: a fluoropolymer based layer, and an adhesive layer in contact with the fluoropolymer based layer, wherein the fluoropolymer based layer comprises a fluoropolymer based material, wherein the adhesive layer comprises a first adhesive layer ultraviolet (UV) absorber component, wherein the multilayer film comprises a lower ultra-violet light transmission (L-UVLT) of not greater than 1.0%, where the L-UVLT of the multilayer film is defined as the percent transmission between 200 nm and 360 nm, wherein the multilayer film comprises a high ultra-violet light transmission (H-UVLT) of not greater than 5.0%, where the H-UVLT of the multilayer film is defined as the percent transmission between 360 nm and 380 nm, and wherein the multilayer film comprises a visual light transmission (VLT) of at least about 50.0%, where the VLT of the multilayer film is defined as the percent transmission between 400 nm and 1100 nm.

Embodiment 2. The multilayer film of embodiment 1, wherein the multilayer film comprises a L-UVLT of not greater than about 0.95%.

Embodiment 3. The multilayer film of embodiment 1, wherein the multilayer film comprises a L-UVLT of at least about 0.0001%.

Embodiment 4. The multilayer film of embodiment 1, wherein the multilayer film comprises a H-UVLT of not greater than about 4.9%.

Embodiment 5. The multilayer film of embodiment 1, wherein the multilayer film comprises a H-UVLT of at least about 0.0001%.

Embodiment 6. The multilayer film of embodiment 1, wherein the multilayer film comprises a VLT of at least about 55.0%.

Embodiment 7. The multilayer film of embodiment 1, wherein the multilayer film comprises a VLT of not greater than about 99.9%.

Embodiment 8. The multilayer film of embodiment 1, wherein the fluoropolymer based material of the fluoropolymer based layer comprises a fluoropolymer.

Embodiment 9. The multilayer film of embodiment 8, wherein the fluoropolymer is selected from the group consisting of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, a copolymer of ethylene and trifluoroethylene, any blend thereof, and any alloy thereof.

Embodiment 10. The multilayer film of embodiment 1, wherein the fluoropolymer based layer comprises a fluoropolymer based material content of at least about 50 wt. % for a total weight of the fluoropolymer based layer.

Embodiment 11. The multilayer film of embodiment 1, wherein the fluoropolymer based layer comprises a fluoropolymer based material content of not greater than about 100% for a total weight of the fluoropolymer based layer.

Embodiment 12. The multilayer film of embodiment 1, wherein the fluoropolymer based layer consists of a fluoropolymer based material.

Embodiment 13. The multilayer film of embodiment 1, wherein the fluoropolymer based layer comprises an ETFE content of at least about 50 wt. % for a total weight of the fluoropolymer based layer.

Embodiment 14. The multilayer film of embodiment 1, wherein the fluoropolymer based layer comprises an ETFE content of not greater than about 100 wt. % for a total weight of the fluoropolymer based layer.

Embodiment 15. The multilayer film of embodiment 1, wherein the fluoropolymer based layer consists of an ETFE.

Embodiment 16. The multilayer film of embodiment 1, wherein the fluoropolymer based layer comprises a thickness of at least about 10 μm.

Embodiment 17. The multilayer film of embodiment 1, wherein the fluoropolymer based layer comprises a thickness of not greater than about 1000 μm.

Embodiment 18. The multilayer film of embodiment 1, wherein the adhesive layer comprises an adhesive component and a first adhesive layer UV absorber component.

Embodiment 19. The multilayer film of embodiment 18, wherein the adhesive layer comprises an adhesive component content of at least about 35%.

Embodiment 20. The multilayer film of embodiment 18, wherein the adhesive layer comprises an adhesive component content of not greater than about 99.95%.

Embodiment 21. The multilayer film of embodiment 18, wherein the adhesive component comprises an acrylic based adhesive, a polyurethane based adhesive, a silicone based adhesive, or an epoxy based adhesive.

Embodiment 22. The multilayer film of embodiment 18, wherein the adhesive layer comprises a first adhesive layer UV absorber component content of at least about 0.05 wt. % for a total weight of the adhesive layer.

Embodiment 23. The multilayer film of embodiment 18, wherein the adhesive layer comprises a first adhesive layer UV absorber component content of not greater than about 65 wt. % for a total weight of the adhesive layer.

Embodiment 24. The multilayer film of embodiment 18, wherein the first adhesive layer UV absorber component comprises a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

Embodiment 25. The multilayer film of embodiment 18, wherein the adhesive layer comprises a second adhesive layer UV absorber component.

Embodiment 26. The multilayer film of embodiment 25, wherein the adhesive layer comprises a second adhesive layer UV absorber component content of at least about 0.05 wt. % for a total weight of the adhesive layer.

Embodiment 27. The multilayer film of embodiment 25, wherein the adhesive layer comprises a second UV adhesive layer absorber component content of not greater than about 65 wt. % for a total weight of the adhesive layer.

Embodiment 28. The multilayer film of embodiment 25, wherein second adhesive layer UV absorber component comprises a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

Embodiment 29. The multilayer film of embodiment 1, wherein the adhesive layer comprises a thickness of at least about 0.1 μm.

Embodiment 30. The multilayer film of embodiment 1, wherein the adhesive layer comprises a thickness of not greater than about 500 μm.

Embodiment 31. The multilayer film of embodiment 1, wherein the adhesive layer comprises a corona-treated surface.

Embodiment 32. The multilayer film of embodiment 31, where the corona-treated surface contacts the fluoropolymer based layer.

Embodiment 33. The multilayer film of embodiment 1, wherein the multilayer film further comprises a PET layer, wherein the adhesive layer is between the fluoropolymer based layer and the PET layer.

Embodiment 34. The multilayer film of embodiment 33, wherein the PET layer comprises a thickness of at least about 0.1 μm.

Embodiment 35. The multilayer film of embodiment 33, wherein the PET layer comprises a thickness of not greater than about 1000 μm.

Embodiment 36. The multilayer film of embodiment 1, wherein the fluoropolymer based layer comprises a first fluoropolymer based layer UV absorber component.

Embodiment 37. The multilayer film of embodiment 36, wherein the fluoropolymer based layer comprises a first fluoropolymer based layer UV absorber component content of at least about 0.05 wt. % for a total weight of the fluoropolymer based layer.

Embodiment 38. The multilayer film of embodiment 36, wherein the fluoropolymer based layer comprises a first fluoropolymer based layer UV absorber component content of not greater than about 65 wt. % for a total weight of the fluoropolymer based layer.

Embodiment 39. The multilayer film of embodiment 36, wherein the first fluoropolymer based layer UV absorber component comprises a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

Embodiment 40. The multilayer film of embodiment 36, wherein the fluoropolymer based layer comprises a second fluoropolymer based layer UV absorber component.

Embodiment 41. The multilayer film of embodiment 40, wherein the fluoropolymer based layer comprises a second fluoropolymer based layer UV absorber component content of at least about 0.05 wt. % for a total weight of the fluoropolymer based layer.

Embodiment 42. The multilayer film of embodiment 40, wherein the fluoropolymer based layer comprises a second fluoropolymer based layer UV absorber component content of not greater than about 65 wt. % for a total weight of the fluoropolymer based layer.

Embodiment 43. The multilayer film of embodiment 40, wherein second fluoropolymer based layer UV absorber component comprises a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

Embodiment 44. A method of forming a multilayer film, wherein the method comprises: providing a fluoropolymer based layer, and forming an adhesive layer that is in contact with the fluoropolymer based layer, wherein the fluoropolymer based layer comprises a fluoropolymer based material, wherein the adhesive layer comprises a first ultra-violet (UV) absorber component, wherein the multilayer film has a lower ultra-violet light transmission (L-UVLT) of not greater than 1.0%, where the L-UVLT of the multilayer film is defined as the percent transmission between 200 nm and 360 nm, wherein the multilayer film has a high ultra-violet light transmission (H-UVLT) of not greater than 5.0%, where the H-UVLT of the multilayer film is defined as the percent transmission between 360 nm and 380 nm, and wherein the multilayer film has a visual light transmission (VLT) of at least about 50.0%, where the VLT of the multilayer film is defined as the percent transmission between 400 nm and 1100 nm.

Embodiment 45. The method of embodiment 44, wherein the multilayer film comprises a L-UVLT of not greater than about 0.95%.

Embodiment 46. The method of embodiment 44, wherein the multilayer film comprises a L-UVLT of at least about 0.0001%.

Embodiment 47. The method of embodiment 44, wherein the multilayer film comprises a H-UVLT of not greater than about 4.9%.

Embodiment 48. The method of embodiment 44, wherein the multilayer film comprises a H-UVLT of at least about 0.0001%.

Embodiment 49. The method of embodiment 44, wherein the multilayer film comprises a VLT of at least about 55.0%.

Embodiment 50. The method of embodiment 44, wherein the multilayer film comprises a VLT of not greater than about 99.9%.

Embodiment 51. The method of embodiment 44, wherein the fluoropolymer based material of the fluoropolymer based layer comprises a fluoropolymer.

Embodiment 52. The method of embodiment 51, wherein the fluoropolymer is selected from the group consisting of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, a copolymer of ethylene and trifluoroethylene, any blend thereof, and any alloy thereof.

Embodiment 53. The method of embodiment 44, wherein the fluoropolymer based layer comprises a fluoropolymer based material content of at least about 50 wt. % for a total weight of the fluoropolymer based layer.

Embodiment 54. The method of embodiment 44, wherein the fluoropolymer based layer comprises a fluoropolymer based material content of not greater than about 100% for a total weight of the fluoropolymer based layer.

Embodiment 55. The method of embodiment 44, wherein the fluoropolymer based layer consists of a fluoropolymer based material.

Embodiment 56. The method of embodiment 44, wherein the fluoropolymer based layer comprises an ETFE content of at least about 50 wt. % for a total weight of the fluoropolymer based layer.

Embodiment 57. The method of embodiment 44, wherein the fluoropolymer based layer comprises an ETFE content of not greater than about 100 wt. % for a total weight of the fluoropolymer based layer.

Embodiment 58. The method of embodiment 44, wherein the fluoropolymer based layer consists of an ETFE.

Embodiment 59. The method of embodiment 44, wherein the fluoropolymer based layer comprises a thickness of at least about 10 µm.

Embodiment 60. The method of embodiment 44, wherein the fluoropolymer based layer comprises a thickness of not greater than about 1000 µm.

Embodiment 61. The method of embodiment 44, wherein the adhesive layer comprises an adhesive component and a first adhesive layer UV absorber component.

Embodiment 62. The method of embodiment 61, wherein the adhesive layer comprises an adhesive component content of at least about 35 wt. % for a total weight of the adhesive layer.

Embodiment 63. The method of embodiment 61, wherein the adhesive layer comprises an adhesive component content of not greater than about 99.95 wt. % for a total weight of the adhesive layer.

Embodiment 64. The method of embodiment 61, wherein the adhesive component comprises an acrylic based adhesive, a polyurethane based adhesive, a silicone based adhesive, or an epoxy based adhesive.

Embodiment 65. The method of embodiment 61, wherein the adhesive layer comprises a first adhesive layer UV absorber component content of at least about 0.05 wt. % for a total weight of the adhesive layer.

Embodiment 66. The method of embodiment 61, wherein the adhesive layer comprises a first adhesive layer UV absorber component content of not greater than about 65 wt. % for a total weight of the adhesive layer.

Embodiment 67. The method of embodiment 61, wherein the first adhesive layer UV absorber component comprises a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

Embodiment 68. The method of embodiment 61, wherein the adhesive layer comprises a second adhesive layer UV absorber component.

Embodiment 69. The method of embodiment 68, wherein the adhesive layer comprises a second adhesive layer UV absorber component content of at least about 0.05 wt. % for a total weight of the adhesive layer.

Embodiment 70. The method of embodiment 68, wherein the adhesive layer comprises a second UV adhesive layer absorber component content of not greater than about 65 wt. % for a total weight of the adhesive layer.

Embodiment 71. The method of embodiment 68, wherein second adhesive layer UV absorber component comprises a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

Embodiment 72. The method of embodiment 44, wherein the adhesive layer comprises a thickness of at least about 0.1 μm.

Embodiment 73. The method of embodiment 44, wherein the adhesive layer comprises a thickness of not greater than about 500 μm.

Embodiment 74. The method of embodiment 44, wherein the adhesive layer comprises a corona-treated surface.

Embodiment 75. The method of embodiment 74, where the corona-treated surface contacts the fluoropolymer based layer.

Embodiment 76. The method of embodiment 44, wherein the multilayer film further comprises a PET layer, wherein the adhesive layer is between the fluoropolymer based layer and the PET layer.

Embodiment 77. The method of embodiment 76, wherein the PET layer comprises a thickness of at least about 0.1 μm.

Embodiment 78. The method of embodiment 76, wherein the PET layer comprises a thickness of not greater than about 1000 μm.

Embodiment 79. The method of embodiment 44, wherein the fluoropolymer based layer comprises a first fluoropolymer based layer UV absorber component.

Embodiment 80. The method of embodiment 79, wherein the fluoropolymer based layer comprises a first fluoropolymer based layer UV absorber component content of at least about 0.05 wt. % for a total weight of the fluoropolymer based layer.

Embodiment 81. The method of embodiment 79, wherein the fluoropolymer based layer comprises a first fluoropolymer based layer UV absorber component content of not greater than about 65 wt. % for a total weight of the fluoropolymer based layer.

Embodiment 82. The method of embodiment 79, wherein the first fluoropolymer based layer UV absorber component comprises a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

Embodiment 83. The method of embodiment 44, wherein the fluoropolymer based layer comprises a second fluoropolymer based layer UV absorber component.

Embodiment 84. The method of embodiment 83, wherein the fluoropolymer based layer comprises a second fluoropolymer based layer UV absorber component content of at least about 0.05 wt. % for a total weight of the fluoropolymer based layer.

Embodiment 85. The method of embodiment 83, wherein the fluoropolymer based layer comprises a second fluoropolymer based layer UV absorber component content of not greater than about 65 wt. % for a total weight of the fluoropolymer based layer.

Embodiment 86. The method of embodiment 83, wherein second fluoropolymer based layer UV absorber component comprises a benzophenone, a benzotriazole, a triazine, a cyanoacrylate, an oxanilide, a benzoxaxinone, a metal oxide including but not limited to titanium oxides, zinc oxides, and iron oxides, a metal halide, or a metal sulfide.

EXAMPLES

The concepts described herein will be further described in the following Examples, which do not limit the scope of the invention described in the claims.

Example 1

Sample multilayer films S1-S15 were configured and formed according to certain embodiments described herein.

For each sample multilayer film S1-S15, an ultraviolet (UV) absorber component is incorporated into a solvent based adhesive system along with the appropriate amount of solvent and additive for the coating method to form the adhesive. The adhesive is coated onto a PET substrate and conveyed through an oven to evaporate the solvent. A layer of ETFE (i.e., the fluoropolymer based layer) is then laminated in line to the adhesive coated PET.

Further configuration and composition details of each sample multilayer film S1-S15 are summarized in Table 1 below.

TABLE 1

Sample Multilayer Film Configuration and Composition

| Sample No. | Fluoropolymer Based Layer Thickness (mil) | PET Substrate Thickness (mil) | Total UV Absorber Component - Dry- (wt. % for total weight of adhesive mixture) |
|---|---|---|---|
| S1 | 2 | 2 | 8.00 |
| S2 | 2 | 2 | 13.33 |
| S3 | 2 | 2 | 26.67 |
| S4 | 2 | 2 | 40.00 |
| S5 | 2 | 2 | 53.33 |
| S6 | 2 | 2 | 66.67 |
| S7 | 2 | 2 | 15.83 |
| S8 | 2 | 2 | 31.67 |
| S9 | 2 | 2 | 47.50 |
| S10 | 2 | 2 | 63.33 |
| S11 | 2 | 2 | 69.67 |
| S12 | 1.5 | 4 | 5.83 |
| S13 | 2 | 2 | 17.5 |
| S14 | 2 | 2 | 58.33 |
| S15 | 2 | 2 | 70.00 |

Performance properties of each sample multilayer film S1-S15 are summarized in Table 2 below. The summarized performance properties include the lower ultra-violet light transmission (L-UVLT) of the multilayer film, where the L-UVLT of the multilayer film is defined as the percent transmission between 200 nm and 360 nm, the high ultraviolet light transmission (H-UVLT) of the multilayer film, where the H-UVLT of the multilayer film is defined as the percent transmission between 360 nm and 380 nm, and the visual light transmission (VLT) of the multilayer film, where the VLT of the multilayer film is defined as the percent transmission between 400 nm and 1100 nm.

TABLE 2

Performance Properties

| Sample No. | L-UVLT (%) | H-UVLT (%) | VLT (%) |
|---|---|---|---|
| S1 | 0.233 | 1.485 | 85.915 |
| S2 | 0.079 | 0.037 | 86.756 |
| S3 | 0.078 | 0.013 | 85.843 |
| S4 | 0.978 | 0.098 | 88.290 |
| S5 | 0.078 | 0.015 | 84.202 |
| S6 | 0.921 | 0.160 | 89.572 |
| S7 | 0.115 | 1.837 | 87.454 |
| S8 | 0.101 | 0.454 | 87.256 |
| S9 | 0.038 | 0.142 | 90.308 |
| S10 | 0.074 | 0.033 | 87.237 |
| S11 | 0.948 | 0.108 | 90.023 |
| S12 | 0.344 | 4.413 | 87.107 |
| S13 | 0.105 | 3.383 | 87.041 |
| S14 | 0.864 | 0.083 | 89.207 |
| S15 | 0.017 | 0.016 | 89.148 |

Example 2

Sample multilayer films S16-S27 were configured and formed according to certain embodiments described herein.

For each sample multilayer films S16-S27, an ultraviolet (UV) absorber component is compounded into an ETFE resin using a twin screw extruder and pelletized. The pelletized material is then extruded to make an ETFE film.

Further configuration and composition details of each sample multilayer film S16-S27 are summarized in Table 3 below.

TABLE 3

Sample Multilayer Film Configuration and Composition

| Sample No. | Fluoropolymer Based Layer Thickness (mil) | Total UV Absorber Component - Dry- (wt. % for total weight of fluoropolymer based layer) |
|---|---|---|
| S16 | 2 | 3.0 |
| S17 | 2 | 5.0 |
| S18 | 2 | 7.0 |
| S19 | 2 | 10.0 |
| S20 | 2 | 12.0 |
| S21 | 2 | 12.0 |
| S22 | 2 | 6.0 |
| S23 | 2 | 6.0 |
| S24 | 2 | 7.0 |
| S25 | 2 | 7.0 |
| S26 | 2 | 7.0 |
| S27 | 2 | 7.0 |

Performance properties of each sample multilayer film S16-S27 are summarized in Table 4 below. The summarized performance properties include the lower ultra-violet light transmission (L-UVLT) of the multilayer film, where the L-UVLT of the multilayer film is defined as the percent transmission between 200 nm and 360 nm, the high ultraviolet light transmission (H-UVLT) of the multilayer film, where the H-UVLT of the multilayer film is defined as the percent transmission between 360 nm and 380 nm, and the visual light transmission (VLT) of the multilayer film, where the VLT of the multilayer film is defined as the percent transmission between 400 nm and 1100 nm.

TABLE 4

Performance Properties

| Sample No. | L-UVLT (%) | H-UVLT (%) | VLT (%) |
|---|---|---|---|
| S16 | 0.541 | 0.178 | 75.633 |
| S17 | 0.207 | 0.049 | 74.004 |
| S18 | 0.093 | 0.023 | 63.032 |
| S19 | 0.158 | 0.048 | 73.930 |
| S20 | 0.189 | 0.071 | 70.783 |
| S21 | 0.150 | 0.035 | 72.149 |
| S22 | 0.092 | 0.513 | 68.841 |
| S23 | 0.068 | 0.452 | 68.183 |
| S24 | 0.034 | 0.119 | 61.434 |
| S25 | 0.091 | 0.298 | 61.668 |
| S26 | 0.350 | 1.738 | 73.982 |
| S27 | 0.080 | 0.522 | 67.204 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:
1. A multilayer film comprising:
   a fluoropolymer based layer, and
   an adhesive layer in contact with the fluoropolymer based layer, wherein the fluoropolymer based layer comprises a fluoropolymer based material, wherein the adhesive layer comprises a first adhesive layer ultra violet (UV) absorber component, wherein the multilayer film comprises a lower ultra-violet light transmission (L-UVLT) of not greater than 1.0%, where the L-UVLT of the multilayer film is defined as the percent transmission between 200 nm and 360 nm, wherein the multilayer film comprises a high ultra-violet light transmission (H-UVLT) of not greater than 5.0%, where the H-UVLT of the multilayer film is defined as the percent transmission between 360 nm and 380 nm, and wherein the multilayer film comprises a visual light transmission (VLT) of at least about 50.0%, where the VLT of the multilayer film is defined as the percent transmission between 400 nm and 1100 nm.

2. The multilayer film of claim 1, wherein the multilayer film comprises a L-UVLT of not greater than about 0.95%.

3. The multilayer film of claim 1, wherein the multilayer film comprises a L-UVLT of at least about 0.0001%.

4. The multilayer film of claim 1, wherein the multilayer film comprises a H-UVLT of not greater than about 4.9%.

5. The multilayer film of claim 1, wherein the multilayer film comprises a H-UVLT of at least about 0.0001%.

6. The multilayer film of claim 1, wherein the multilayer film comprises a VLT of at least about 55.0%.

7. The multilayer film of claim 1, wherein the multilayer film comprises a VLT of not greater than about 99.9%.

8. The multilayer film of claim 1, wherein the fluoropolymer is selected from the group consisting of fluorinated ethylene propylene copolymer (FEP), a copolymer of ethylene and fluorinated ethylene propylene (EFEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), polyvinylidene fluoride (PVDF), a terpolymer including tetrafluoroethylene, hexafluoropropylene, and vinylidenefluoride (THV), a terpolymer of tetrafluoroethylene, hexafluoropropylene, and ethylene (THE), a copolymer of chlorotrifluoroethylene and vinylidenefluoride, a copolymer of ethylene and trifluoroethylene, any blend thereof, and any alloy thereof.

9. The multilayer film of claim 1, wherein the fluoropolymer based layer comprises a fluoropolymer based material content of at least about 50 wt. % for a total weight of the fluoropolymer based layer.

10. The multilayer film of claim 1, wherein the fluoropolymer based layer consists of a fluoropolymer based material.

11. The multilayer film of claim 1, wherein the fluoropolymer based layer comprises an ETFE content of at least about 50 wt. % for a total weight of the fluoropolymer based layer.

12. The multilayer film of claim 1, wherein the fluoropolymer based layer comprises an ETFE content of not greater than about 100 wt. % for a total weight of the fluoropolymer based layer.

13. The multilayer film of claim 1, wherein the fluoropolymer based layer consists of an ETFE.

14. The multilayer film of claim 1, wherein the fluoropolymer based layer comprises a thickness of at least about 10 μm.

15. The multilayer film of claim 1, wherein the fluoropolymer based layer comprises a thickness of not greater than about 1000 μm.

16. The multilayer film of claim 1, wherein the adhesive layer comprises an adhesive component and a first adhesive layer UV absorber component.

17. The multilayer film of claim 16, wherein the adhesive layer comprises an adhesive component content of at least about 35% and not greater than about 99.95%.

18. A method of forming a multilayer film, wherein the method comprises:

providing a fluoropolymer based layer, and forming an adhesive layer that is in contact with the fluoropolymer based layer, wherein the fluoropolymer based layer comprises a fluoropolymer based material, wherein the adhesive layer comprises a first ultra-violet (UV) absorber component, wherein the multilayer film has a lower ultra-violet light transmission (L-UVLT) of not greater than 1.0%, where the L-UVLT of the multilayer film is defined as the percent transmission between 200 nm and 360 nm, wherein the multilayer film has a high ultra-violet light transmission (H-UVLT) of not greater than 5.0%, where the H-UVLT of the multilayer film is defined as the percent transmission between 360 nm and 380 nm, and wherein the multilayer film has a visual light transmission (VLT) of at least about 50.0%, where the VLT of the multilayer film is defined as the percent transmission between 400 nm and 1100 nm.

* * * * *